United States Patent
Schobergegger et al.

(12)
(10) Patent No.: US 6,832,669 B2
(45) Date of Patent: Dec. 21, 2004

(54) DEFORMATION ELEMENT

(75) Inventors: Michael Schobergegger, Scheifling (AT); Georg Schmeja, Graz (AT)

(73) Assignee: Siemens SGP Verkehstechnik GmbH, Vienna (AT)

( * ) Notice: Subject to any disclaimer, the term of this patent is extended or adjusted under 35 U.S.C. 154(b) by 0 days.

(21) Appl. No.: 10/223,500

(22) Filed: Aug. 19, 2002

(65) Prior Publication Data

US 2003/0019703 A1 Jan. 30, 2003

Related U.S. Application Data

(63) Continuation of application No. PCT/AT01/00039, filed on Feb. 19, 2001.

(30) Foreign Application Priority Data

Feb. 18, 2000 (AT) .......................................... A 251/2000

(51) Int. Cl.$^7$ ................................................. F16F 7/12
(52) U.S. Cl. ........................ 188/377; 188/371; 188/376; 293/133
(58) Field of Search ................................. 188/377, 376, 188/371; 298/189; 293/133

(56) References Cited

U.S. PATENT DOCUMENTS

| 3,842,222 A | * | 10/1974 | Hogland ...................... 188/377 |
| 3,842,944 A | * | 10/1974 | Shiotani et al. ............. 188/377 |
| 4,492,291 A | | 1/1985 | Chometon et al. .......... 188/377 |
| 5,033,593 A | * | 7/1991 | Kazuhito .................... 188/377 |
| 5,431,445 A | * | 7/1995 | Wheatley .................... 188/377 |
| 5,566,777 A | * | 10/1996 | Tronner et al. ............. 188/377 |

FOREIGN PATENT DOCUMENTS

JP 7145842 6/1995

* cited by examiner

Primary Examiner—Matthew C. Graham
(74) Attorney, Agent, or Firm—Thomas R. Vigil; Welsh & Katz, Ltd.

(57) ABSTRACT

The deformation element (1) of a rail-borne vehicle is disposed in the region of at least one deformation zone (3) located on the end side of the vehicle, wherein the deformation element (1) is formed as a tubular hollow box (6) with at least one sidewall (9) of the deformation element (1) being formed with a polygonal cross-section comprises an inwardly directed indentation (4), wherein the indentation (4) is provided on the longitudinal-side end region of the deformation element (1) remote from the rail-borne vehicle underframe (2).

7 Claims, 3 Drawing Sheets

DEFORMATION ELEMENT

CROSS REFERENCE TO RELATED APPLICATIONS

This application is a continuation of PCT/AT01/0039 filed on Feb. 19, 2001 which claims priority from Austrian Application No. A 251/2000 filed on Feb. 18, 2000.

BACKGROUND OF THE INVENTION

1. Field of the Invention

The present invention relates to a deformation or crumple element of a rail-borne vehicle which is disposed in the region of at least one deformation zone located on the end side of the vehicle, wherein the deformation element is formed as a tubular hollow box.

2. Description of the Prior Art

For financial reasons and reasons relating to safety technology, deformation zones are usually provided in the region of the ends located on the longitudinal side of a rail-borne vehicle. On the one hand, this serves to obviate or reduce any damage to the vehicle in the event of an accident, on the other hand vehicle passenger safety is thereby increased. The parts of a rail-borne vehicle which are most frequently directly involved in accidents are the front and rear carriage end region, since most accidents are rear end collisions—in the case of a train consisting of several coupled carriages individual carriages can collide together in an accident—or are head-on collisions involving other traffic participants or obstacles.

Therefore, in order to protect a rail-borne vehicle tubular deformation elements which can be compressed and folded in the event of a sufficiently strong force effect are integrated in the prior art into the front and mostly also into the rear vehicle face. This feature serves to use up some of the kinetic energy, which acts upon the vehicle, for the deformation of the deformation element. Reducing the kinetic energy in this way serves also to reduce the loading which acts upon the rest of the rail-borne vehicle.

U.S. Pat. No. 4,492,291 disclose a device for protecting an unloading vessel against damage caused by falling unloading containers. For this purpose, the base of the unloading vessel is provided with a damping element which comprises two plates which lie one on top of the other and which are mutually connected via tubular deformation elements, wherein the longitudinal extension of the tubular deformation elements is substantially perpendicular to the surface of the plates. In order to improve the characteristic of the introduction of force into the deformation elements in the event of an unloading container impacting against the damping element, an end region of the deformation elements comprises an indentation in the sidewalls.

JP07145842 describes a tubular deformation element for a car, wherein an end region of the deformation element comprises a lateral indentation. The object forming the basis of JP07145842 is to absorb an impact as effectively as possible by means of a light-weight aluminium construction.

By reason of the substantial intrinsic weight and the associated high kinetic energy of a rail-borne vehicle, it is still possible for extremely high peaks of force to occur during accidents when conventional deformation elements are used, for which reason the solution disclosed in JP07145842 is not suitable for rail-borne vehicles.

Typically, the attempt is made to obviate the production of high force peaks in that mutually separately installed deformation elements, which are designed as straightforward tubular hollow bodies mostly having an approximately square cross-section, are integrated in parallel adjacent to each other into the vehicle face, wherein the longitudinal sides of the deformation elements are disposed in parallel with respect to the direction of travel. Conventionally, these deformation elements are affixed in the head regions of the vehicle underframe and are connected together by means of a transverse beam acting as a bumper. The entire vehicle's deformation characteristic to be achieved determines how many deformation elements are used and whether these deformation elements are installed at only one or both ends of a carriage.

A disadvantage of the known devices is that undesirably high force peaks can nevertheless occur before the deformation elements fold, as the trigger force of the typically used deformation elements is ca. three times as high as the average deformation force thereof.

The term trigger force is understood to refer to the force which must be applied at the very least in order to initiate a plastic deformation of the deformation element. If the deformation procedure is described with the aid of a force-path diagram, then the amplitude of the maximum occurring force peak corresponds to the trigger force. In other words, the trigger force is the maximum force occurring during the deformation procedure. The average deformation force corresponds to the mean value of the progression of force in the aforementioned force-path diagram. However, the level of energy conversion is determined by the average deformation force. Therefore, it is desirable to achieve this range as quickly as possible during a deformation. In order to achieve the desired deformation characteristic, the trigger force would have to be at the level of the average deformation force. However, no structural deformation element is known which can solve this problem.

In order to prevent the high force peak which occurs in the event of an accident from damaging the rail-borne vehicle or injuring vehicle passengers, the remaining vehicle structure must therefore be designed to be correspondingly more robust and heavier, whereby the value of the useful load of the rail-borne vehicle is reduced and production costs are also increased.

BRIEF SUMMARY OF THE INVENTION

In view of the state of the art described above, it is an object of the invention to provide a deformation element, wherein the trigger force is reduced to the level of the average deformation force of said deformation element, whereby the intrinsic weight of rail-borne vehicles and the production costs thereof can be reduced substantially.

This object is achieved in accordance with the invention by virtue of the fact that at least one sidewall of the deformation element, which is formed with a polygonal cross-section, comprises an inwardly directed indentation, wherein the indentation is provided on the longitudinal-side end region of the deformation element remote from the rail-borne vehicle underframe.

By virtue of the arrangement of at least one indentation in the deformation element, it is possible to reduce the trigger force to the level of the average deformation force.

In order to reduce the trigger force, it is advantageous that the indentation is provided in an end region of the deformation element lying in the direction of travel, since this end region is the first to absorb the dynamic loading which occurs in the event of an accident. During a deformation, the level of the average deformation force is achieved immediately in this manner without the occurrence of high force peaks.

In accordance with one cost-effective embodiment which is easy to produce, two mutually opposite-lying indentations are disposed in mutually parallel sidewalls of the deformation element.

It is possible to achieve extremely favourable deformation characteristics by virtue of the fact that the deformation element comprises a substantially square cross-section.

In order to improve the deformation characteristic, sidewalls which are in contact with the at least one sidewall, which comprises an indentation, are formed on the contact points with the indentation in such a manner as to have an identical cross-section thereto.

In accordance with one advantageous embodiment, the cross-section of the deformation element comprises a side length which amounts to between 100 and 200 mm.

In order to guarantee a sufficiently large deformation path, the length of the deformation element preferably amounts to between 800 and 1200 mm.

In one advantageous embodiment, the wall thickness of the deformation element amounts to between 3 and 7 mm.

BRIEF DESCRIPTION OF THE SEVERAL VIEWS OF THE DRAWINGS

The invention together with further advantages is explained in detail hereinunder with reference to one exemplified embodiment which is illustrated in the drawings, in which.

DETAILED DESCRIPTION OF THE INVENTION

Figure 1:
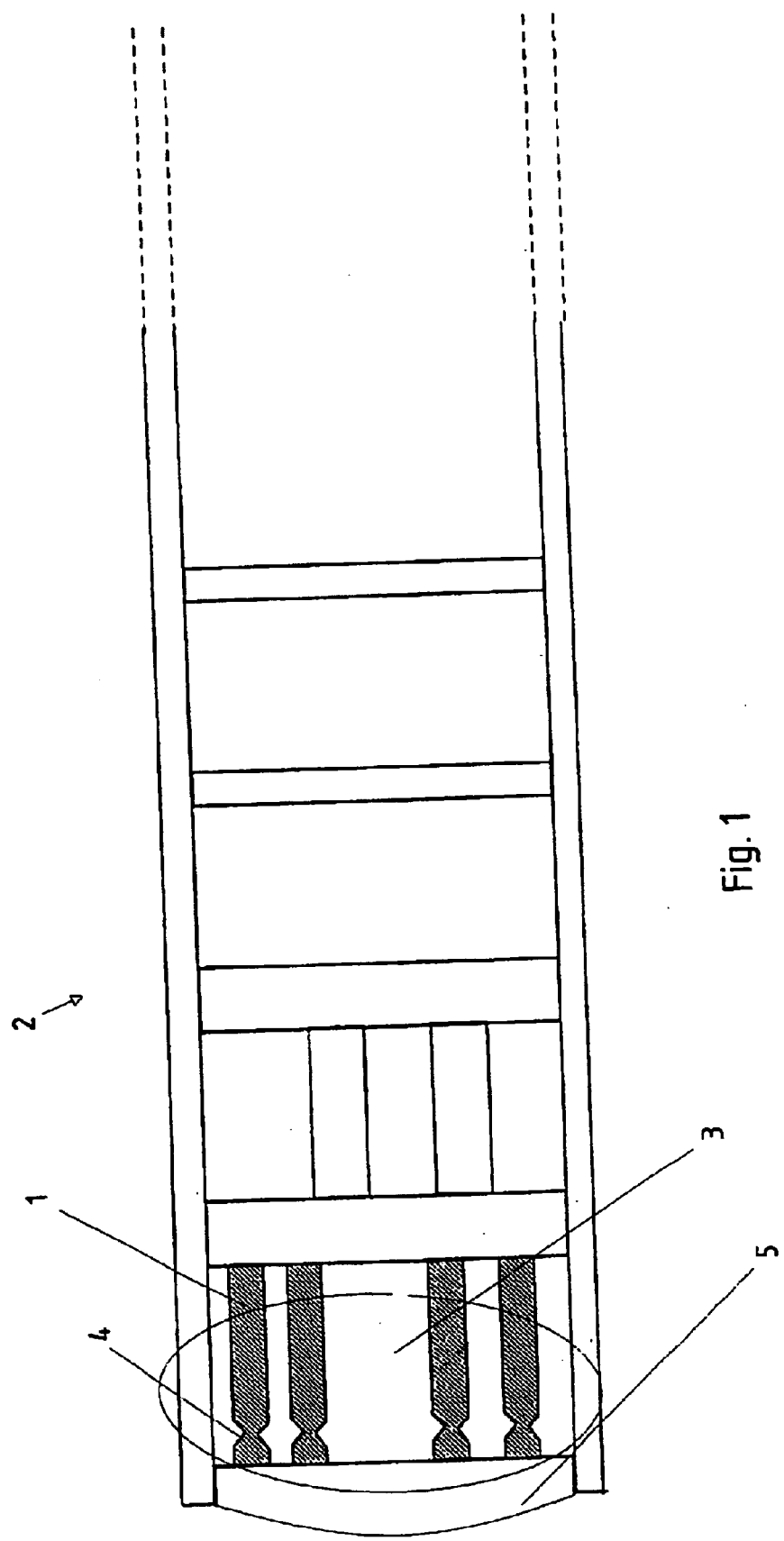
FIG. 1 shows a plan view of a schematically illustrated part of a rail-borne vehicle underframe having deformation elements in accordance with the invention.

As shown in FIG. 1, deformation elements 1 in accordance with the invention are disposed in the region of a deformation zone 3 of a rail-borne vehicle underframe 2, wherein the longitudinal axes of the deformation elements 1 extend in parallel with the longitudinal axis of the vehicle. On the vehicle face, the individual deformation elements 1 are mutually connected via a transverse beam 5 which performs the function of a bumper. The end portions of the deformation elements 1 located in closer proximity to the transverse beam 5 comprise indentations 4. This feature substantially renders it possible to reduce the trigger force of the deformation elements 1. In the case of a head-on collision with another rail-borne vehicle or an obstacle, the force is introduced into the deformation elements 1 via the transverse beam 5 which is preferably designed as a welded box.

Figure 2:
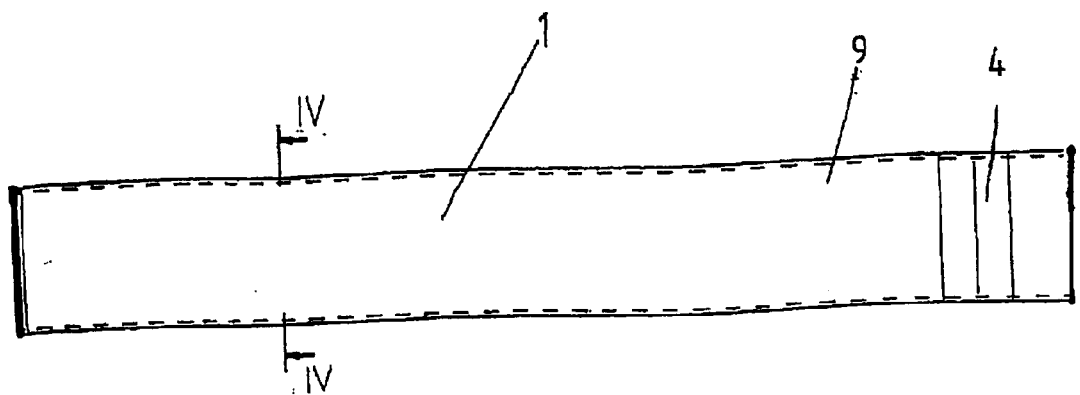
FIG. 2 shows a side view of a deformation element in accordance with the invention.

As shown in FIG. 2, the deformation element 1 comprises rectangular lateral surfaces which form a hollow box 6.

In order to reduce the force which triggers the deformation procedure, two lateral surfaces of the deformation element 1 are provided in the end region in closer proximity to the transverse beam 5 with a respective indentation 4 which extends over the entire width of the lateral surface. Of course, it would be also feasible for the other two sides to comprise an indentation 4 in each case. However, it has been shown in deformation tests that the desired deformation characteristic can readily be achieved with two laterally disposed indentations 4.

Figure 3:
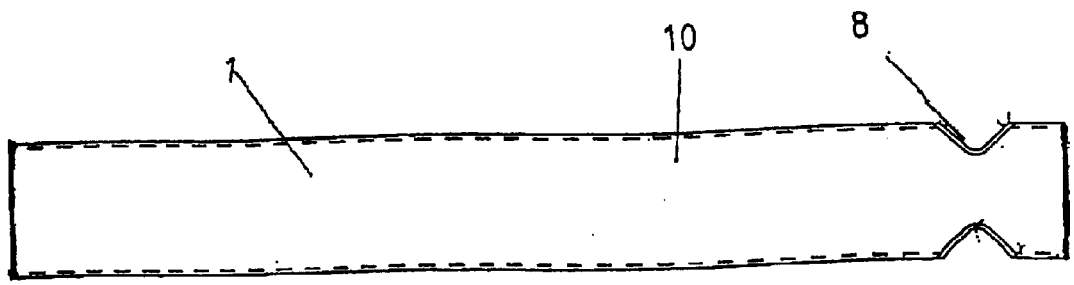
FIG. 3 shows a plan view of a deformation element in accordance with the invention.

It is evident in FIG. 3 that the indentations 4 are provided on mutually opposite-lying sides of the deformation element 1. In order to improve the deformation characteristic, sidewalls 10 which are in contact with the at least one sidewall 9, which comprises an indentation 4, are formed on the contact points 8 with the indentation 4 in such a manner as to have an identical cross-section thereto. During production, the points 8 are cut out in this case in accordance with the cross-sectional shape of the indentations.

Numerous tests have demonstrated that the indentations 4 are shaped in a particularly favourable manner when they comprise the cross-section of an isosceles triangle, wherein the longest side is open. The value of the trigger force can change over the angle between the two equal-length cross-sectional sides of the indentations 4. In the preferred embodiment, this angle amounts substantially to 90°, wherein the angle can be changed depending upon the desired deformation characteristic. Since the deformation characteristic depends very much upon the geometry of the deformation element 1—cross-sectional area of the deformation element or side length—an angle other than 90° can be provided according to the respective embodiment.

Although it is possible in principle to provide the indentations 4 at any point in the sidewalls of the deformation element 1, it is advantageous if the indentations 4 are disposed in the region of the sidewalls of the deformation element 1, which region is the first to absorb the occurring dynamic loading in the event of an accident. In other words, the indentations 4 should advantageously be disposed in a lateral manner in an end region of the deformation element 1 lying in the direction of travel. It is possible to achieve an extremely favourable deformation characteristic by virtue of the fact that the spacing between the point of intersection of the two equal-length sides of the indentations 4 and the transverse beam 5 is in the range between 70 and 120 mm.

Figure 4:
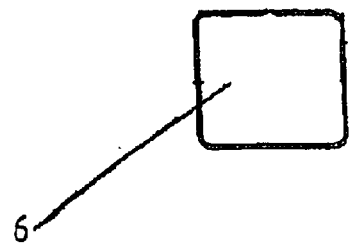
FIG. 4 shows a cross-section taken along line IV—IV in FIG. 2.

As shown in FIG. 4, the deformation element 1 in accordance with the invention is formed as a hollow box 6 having a substantially square cross-section. Virtually every symmetrical cross-sectional shape of the hollow boxes 6—circle, rectangle, hexagon—is suitable in principle for a deformation element 1 in accordance with the invention. For example, it is also feasible to provide three indentations 4 in a deformation element 1 having a hexagonal cross-section. However, practice has shown that for deformation elements 1 a square cross-section has the most favourable ratio of trigger force to average deformation force.

Figure 5:
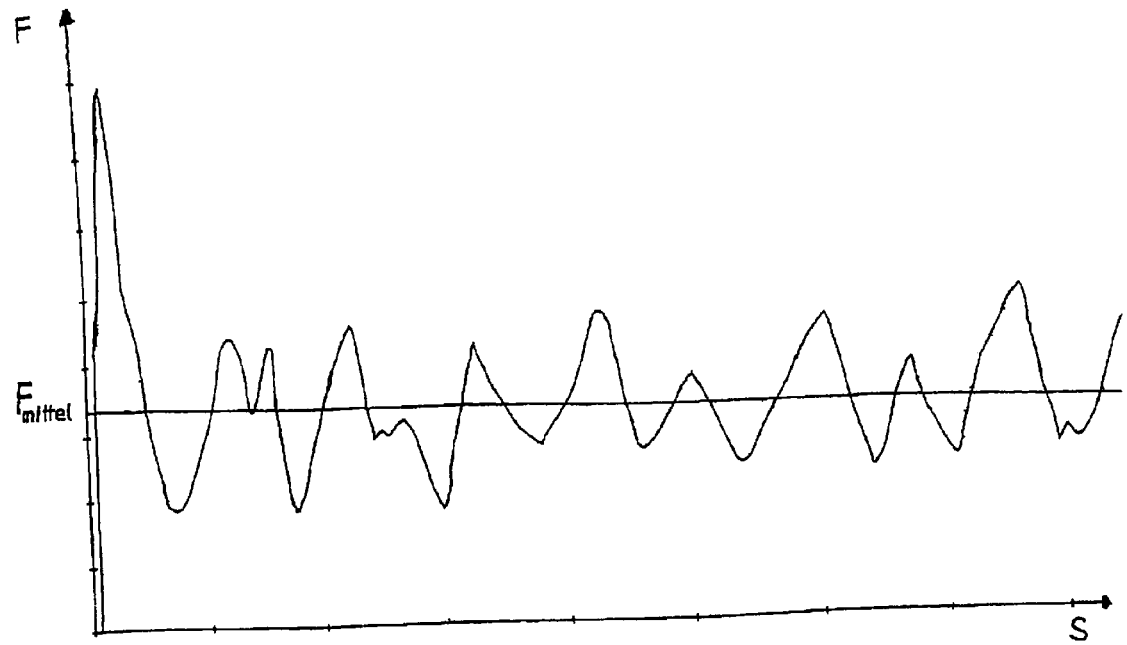
FIG. 5 shows a force-path diagram of an attempt at deformation performed by a conventional deformation element.

As shown in FIG. 5, the trigger force of a typically used deformation element 1 having a square cross-sectional area is about three times as great as the average deformation force. In the illustrated diagram, the force F acting upon the deformation element 1 during the deformation procedure is plotted over the deformation path s. The deformation path s covered corresponds to the reduction in length of the deformation element 1. In the force-path diagram, the amount of reduced energy is equal to the area below the force-curve F. By definition, this area is equal to the product of average deformation force $F_{mittel}$ and the deformation path s of the deformation element 1. Ideally, the trigger force of a deformation element 1 should therefore be at the level of the average deformation force $F_{mittel}$, since the level of energy absorption depends mainly upon the value of the average deformation force $F_{mittel}$ and not upon the trigger force. In turn, the average deformation force $F_{mittel}$ depends on the one hand upon the cross-sectional area of the deformation element 1 and on the other hand upon its side length.

Figure 6:
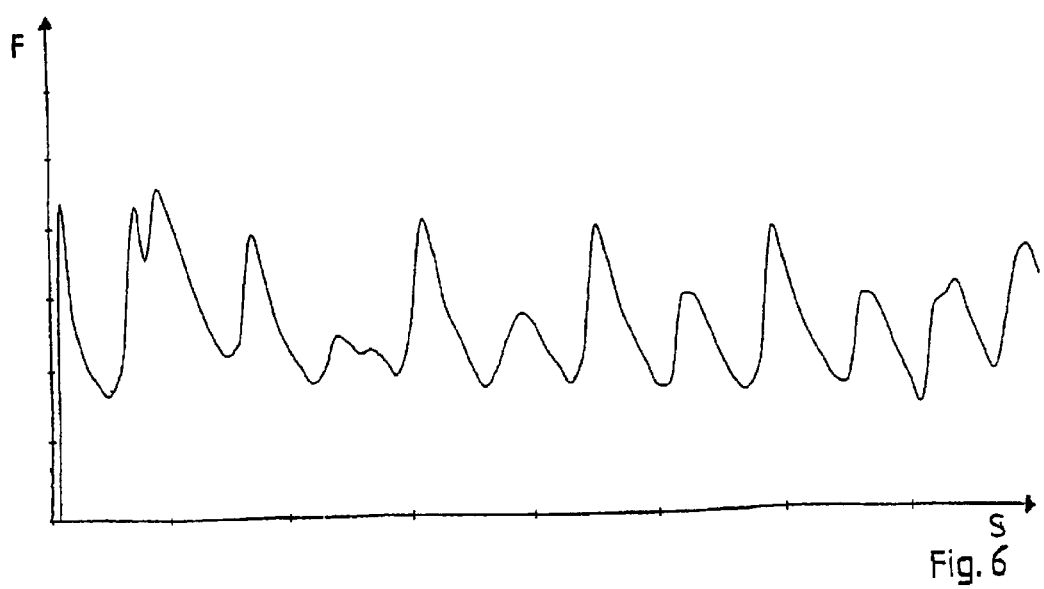
FIG. 6 shows a force-path diagram of an attempt at deformation performed by a deformation element in accordance with the invention.

It is evident in FIG. 6 that by virtue of the arrangement of indentations 4 on a deformation element 1 it is possible to reduce the trigger force to such an extent as to be in the range of the average deformation force $F_{mittel}$ of the deformation element 1. Therefore, in the case of a deformation element 1 in accordance with the invention, an optimum ratio of trigger force to average deformation force $F_{mittel}$ is accomplished.

What is claimed is:

1. Deformation element (1) of a rail-borne vehicle which is disposed in the region of at least one deformation zone (3) located on the end side of the vehicle, wherein the deformation element (1) is formed as a tubular hollow box (6), characterised in that the deformation element is, separate from the vehicle under frame, the deformation element is formed with a polygonal cross-section and the deformation consists essentially of two mutually opposite indentations (4) disposed in mutually parallel sidewalls (9) of the deformation element with each indentation (4) being provided on the longitudinal side end region of the deformation element (1) which is mounted on a longitudinal side remote from the rail-borne vehicle under frame (2).

2. Deformation element as claimed in claim 1, characterised in that two mutually opposite-lying indentations (4) are disposed in mutually parallel sidewalls (9) of the deformation element (1).

3. Deformation element as claimed in claim 1, characterised in that it comprises a substantially square cross-section.

4. Deformation element as claimed in claim 1, characterised in that sidewalls (10) which are in contact with the at least one sidewall (9), which comprises an indentation (4), are formed on the contact points (8) with the indentation (4) in such a manner as to have an identical cross-section thereto.

5. Deformation element as claimed in claim 3, characterised in that its cross-section comprises a side length which amounts to between 100 and 200 mm.

6. Deformation element as claimed in claim 1, characterised in that its length amounts to between 800 and 1200 mm.

7. Deformation element as claimed in claim 1, characterised in that its wall thickness amounts to between 3 and 7 mm.

* * * * *